United States Patent [19]
Cave

[11] Patent Number: 5,327,490
[45] Date of Patent: Jul. 5, 1994

[54] SYSTEM AND METHOD FOR CONTROLLING CALL PLACEMENT RATE FOR TELEPHONE COMMUNICATION SYSTEMS

[75] Inventor: Ellis K. Cave, Garland, Tex.

[73] Assignee: InterVoice, Inc., Dallas, Tex.

[21] Appl. No.: 657,631

[22] Filed: Feb. 19, 1991

[51] Int. Cl.⁵ .......................... H04M 1/26; H04Q 3/64
[52] U.S. Cl. ...................................... 379/216; 379/92; 379/266; 379/309
[58] Field of Search ............... 379/266, 309, 265, 216, 379/92

[56] References Cited
U.S. PATENT DOCUMENTS

| | | | |
|---|---|---|---|
| 4,599,493 | 7/1986 | Cave | 379/247 |
| 4,797,911 | 1/1989 | Szlam et al. | 379/67 |
| 4,829,563 | 5/1989 | Crockett et al. | 379/309 |
| 4,858,120 | 8/1989 | Samuelson | 364/401 |
| 4,881,261 | 11/1989 | Oliphant et al. | 379/215 |
| 4,933,964 | 6/1990 | Girgis | 379/67 |
| 5,155,763 | 10/1992 | Bigus et al. | 379/113 |
| 5,179,589 | 1/1993 | Syu | 379/265 |
| 5,247,569 | 9/1993 | Cave | 379/113 |

*Primary Examiner*—Thomas W. Brown
*Attorney, Agent, or Firm*—Winstead Sechrest & Minick

[57] ABSTRACT

A system and method is disclosed for controlling call placement rates for telephone systems providing call pacing system in which outbound calls are automatically paced so that as attendants become available a valid call is completed to be handled by the available attendant. The system takes advantage of a system which statistically monitors the average call completion time, the average agent in-use time, the average time to answer and the probability of a valid answer. Call placing overlap is controllable in conjunction with the monitored statistical parameters to achieve operation around any desired system operating parameter. The system is controlled by a plurality of precisely defined operational tasks operating in a hierarchical manner.

44 Claims, 5 Drawing Sheets

$$PA = \frac{4}{7} = .57$$

$$ACT = \frac{227}{7} = 32.42$$

$$ATTA = \frac{ACT}{PA} = \frac{32.42}{.57} = 56.8$$

$$AVERAGE \frac{640}{7} = 91.43$$

$$AVERAGE \frac{600}{7} = 85.71$$

FIG. 3A  PA  | 1 | 0 | 0 | 1 | 0 | 1 | 1 |

FIG. 3B  ACT | 35 | 20 | 25 | 56 | 25 | 40 | 32 |

FIG. 3C  AGENT 1 | 70 | 85 | 60 | 120 | 180 | 50 | 75 |

FIG. 3D  AGENT 2 | 50 | 70 | 180 | 75 | 90 | 50 | 85 |

STATISTICAL TASK

- monitor statistical parameters concerning call completion times and attendant availability
- calculate ATTA
- determine AAIUT
- calculate PA over a time period
- calculate ACT over a time period
- calculate ACT/PA

SCHEDULE TASK

- incorporate a delay parameter depending upon a desired approximate balance between idle attendants and amount of hold time
- adjust timing of attempted outbound calling connections depending upon attendant availability, call completion parameters and delay parameter
- calculate a time to start calling for each attendant based upon AAIUT-ATTA
- adjust time to start calling in accordance with the delay parameter
- establish calls on an attendant by attendant basis depending upon the monitored statistical parameters for each attendant
- control answered connections to each attendant
- connect agent to an answered line under control of queuing task and based upon information provided by answer and call tasks
- change a number of said concurrently attempted outbound calls 111,112,113

FIG. 8

ANSWER TASK

- control answers to calling connections
- trigger call tasks until receive an answer
- report results to answer-scheduler spawned by answer-scheduler task
- report to processor and to statistical and queuing tasks when an answer occurs and when an agent connects to an answer connection 121, 122, 123, 123A

FIG. 9

QUEUING TASK

- determine actual busy-idle status of each attendant
- complete an attempted call with a first available idle attendant without regard to the actual attendant for whom the attempted call was initiated
- keep an ordered queue for idle agents and another for calls on hold
- complete call between call on hold the longest and first free agent
- assign call completions to a queue regardless of which agent the calls were established for

CALL TASK

- automatically attempt outbound call placement
- control placement of calling connections
- make one call and stay in existence until line disconnects
- report when answer occurs and when agent connects are spawned by answer-scheduler task
- concurrently attempt a plurality of outbound calling connections 131, 131A, 132, 132A, 133, 133A, 133B, 133C

SYSTEM AND METHOD FOR CONTROLLING CALL PLACEMENT RATE FOR TELEPHONE COMMUNICATION SYSTEMS

TECHNICAL FIELD OF THE INVENTION

This invention relates to automatic call pacing systems and more particularly to a system and method for predicting and controlling the timing (pacing) of outgoing telephone calls.

BACKGROUND OF THE INVENTION

Recently, a new development in telecommunications has taken place. Systems have been developed, for example, U.S. Pat. Nos. 4,599,493 and 4,797,911 which automatically dial a number and then connect a live operator when the called party answers the call. For efficiency, because there are always a certain number of unanswered or busy calling connections, and because some of the numbers called are, in fact, machines, it stands to reason that an automated call placing (ACP) system can improve efficiency by attempting more calls than there are agents. To make this effective, the system should begin the call placement routine before a live operator is actually available. However, this procedure opens the possibility of an answer occurring with no available operator.

On the one hand, for the sake of economy, a system manager would like to have all of the agents busy all of the time. On the other hand, it is important in many applications to minimize the amount of time a called party is placed on hold. It is the nature of ACP systems that these two goals are mutually exclusive, that is to say: You can have 100 percent agent utilization but at the cost of lengthy customer hold time, or have no customer hold time at the cost of low agent utilization (long agent idle time). The purpose of a pacing algorithm is to allow the system operator to control one or the other of these parameters. By setting the pacing level, a system operator can make the trade-off between these parameters.

Other parameters around which systems can be controlled are the number of customers waiting for an agent; the number of disconnects on hold by answered customers; operator idle time, or perhaps the amount of time that a customer must wait on hold. None of the existing operating system set points are appropriate in all situations.

Accordingly, automated call pacing systems require a system and method of allowing the system operator to control the trade-off between attendant efficiency and customer waiting time.

One difficulty with such a system is that the statistics of the telephone network and the call receiving public are not static, i.e., the probability of an answer can change from time to time. This is compounded in that the size of the operator pool itself may change, as well as the time an operator is engaged on a particular calling connection. Therefore, this makes the above requirement even more difficult to achieve.

Accordingly, a need exists in the art for an automated call pacing system which takes into account a myriad of diverse operating conditions and allows the user to set the balance between customer hold times and operator efficiency.

A further need exists in the art for such a system which will hold the selected operating point even while other system independent variables, such as the number of operators, probability of answer and agent task time change.

SUMMARY OF THE INVENTION

We have solved the problems inherent with automatic call placement (ACP) by implementing an enhancement to existing predictive dialing systems. This enhancement allows an ACP system to automatically place calls for live agents in such a way as to cause a new call to be answered close to the time when the agent finishes talking on the previous call.

The purpose of any predictive dialer is to keep agents busy handling phone calls. This means that any part of the call-placing process that can be automated, should be. Of course, the system can automatically dial the number for the agent, but this typically only saves a few seconds of the agent's time on each call.

A much more productive call task to automate is the time the agent spends listening to the ringing and waiting for an answer. If a system can automatically determine when the phone is ringing and when a person answers the phone, then this process can be done in parallel with the agent's conversation. This can easily save more than half of the agent's time on a call, considering that the agent may have to place several calls before obtaining a valid answer.

To accurately predict when a new call should be placed, the predictor must perform two tasks. First, the predictor gathers statistics about call times and agent talk times. Second, the new call placing time must be calculated and calls placed.

The statistics task must gather data and calculate several statistics parameters to be used by the predictor. The two primary statistics are: How long (statistically) will the agent talk (Average Agent In-Use Time—AAIUT) and how long (statistically) and how many calls will it take to get a live answer on a call when placing calls (Average Time To Answer—ATTA).

The second task that the predictive algorithm must perform is to utilize AAIUT and ATTA to determine when to place new calls for an agent.

Once the call placing algorithm knows these two average times, it can calculate how long to wait after the agent has started talking before starting to place calls to get the next answer. This wait time is called the time to start calling (TSC), and it is the time the system will wait after the connection of an agent to a call before starting to place new calls. The formula for TSC in a simple one agent, two-line system is as follows:

$$TSC = AAIUT - ATTA$$

This equation gives the best statistical estimate of when to start placing calls. Using this formula, the probability of an answered call coming before or after the agent finishes talking is about equal (0.5). This formula can be repeated for a system with x agents and 2x lines. Other ramifications of the equation are that the average number of agents that had to wait to take a new call will be about the same as the number of customers that had to wait for an agent, over a period of time. Also this equation makes the amount of time that customers wait on calls roughly equal to the idle times of the agents. This operation point can be shown to minimize the "wasted" time on a system where wasted time is the sum of agent idle time and customer hold time. A figure of merit for this system can be obtained by summing the total agent idle time and customer hold time together for a specific period of time. However, minimizing the sum of agent idle time and customer hold times may not be what is required in the application. Some users would like near-zero agent idle time while allowing called parties to be placed on hold longer. Other users would like near-zero customer hold times while allowing agents to be idle longer. Both can be accomplished by placing a variable delay in the TSC equation. The new equation is:

$$TSC = AAIUT - ATTA + DELAY$$

If the pacing delay value is positive, the system will place calls later than optimally. This will cause the agent idle times to go up, and customer hold times to go down. If the delay value is negative, the system will place calls earlier than optimal. This will cause agent idle times to get smaller, and hold times to get longer. A major advantage of the invention is that once the delay parameter is set, the method described will hold the idle/hold trade-off relatively stable over changes in number of agents, agent talk time, or probability of answer without use of feedback methods, thus eliminating oscillation and other stability problems inherent in previous pacing algorithms.

Accordingly, one technical advantage of this invention is the placing of calls in which outbound calls are automatically spaced in response to a single user controlled variable so that, as attendants become available, a valid call is completed to an available called party, based upon a preset balance point between idle agents and on-hold parties.

It is another technical advantage of the invention that advantage is taken of a system which statistically monitors the average call completion time, the average agent in-use time, the average time to answer, and the probability of a valid answer to generate the calls in an orderly fashion so that as system parameters change, the desired balance point of the system is maintained.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Before beginning a discussion of the predictive algorithm, it might be helpful to understand the context in which the algorithm is to be used. This is best illustrated from a review of FIG. 4 in which telephone trunks 401 from a telephone exchange (not shown) extend through telephone switch 46 in a conventional way and via telephone lines 402 to telephone stations 44, 45, which are utilized by agents one and two. Each of these agents also has a keypad and computer input terminal 42, 43 connected via lines 403 to computer 41.

Figure 4:
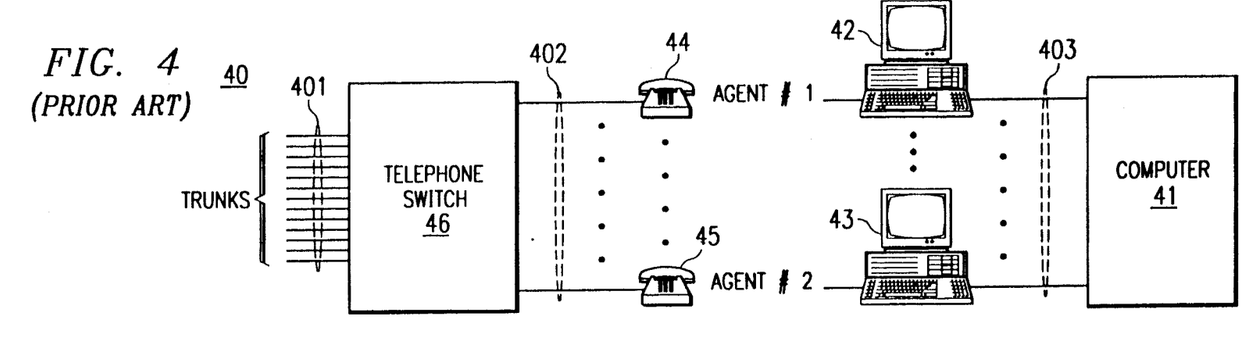
FIG. 4 shows a prior art system using a computer for generating information for each attendant.

Traditionally, the system can be used so that computer 41 places on the screen a phone number which agent one then dials in a conventional way to connect station 42 to a called party via trunk lines 401.

Over the years, this has become a mainstay of telephone solicitation or telephone response. However, in recent years, a new system shown in FIG. 5 has automated the placement of calls so as to increase the efficiency of the attendants. Such a system is the subject of U.S. Pat. No. 4,829,563 dated May 9, 1989, in the name of Crockett, et al, which patent is hereby incorporated by reference herein.

Figure 5:
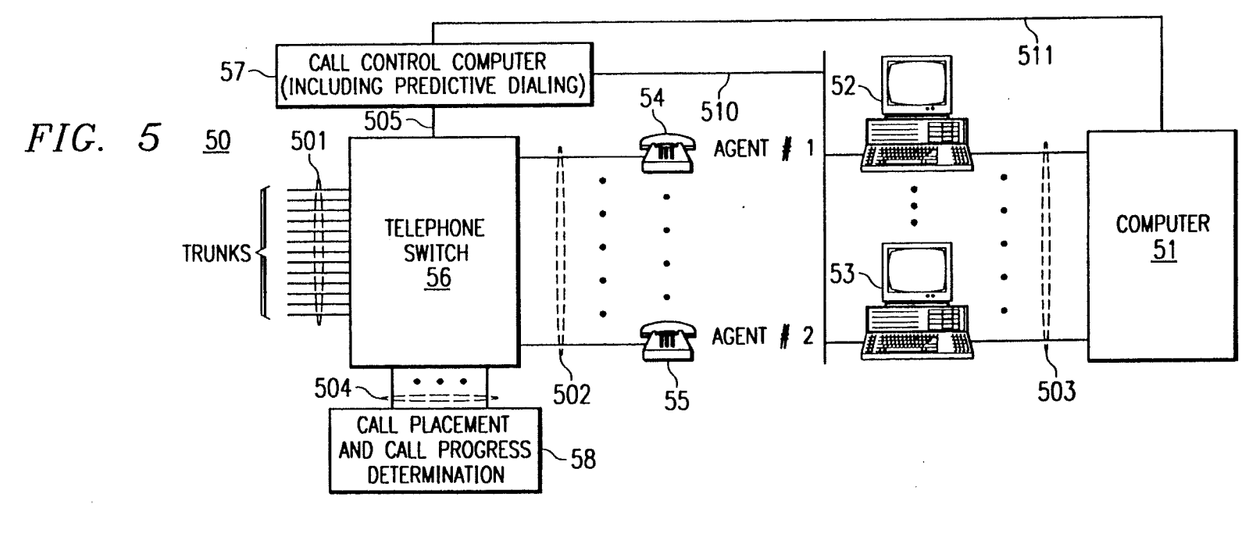
FIG. 5 shows a system using the predictive dialing algorithm of the present invention.
Figure 6:
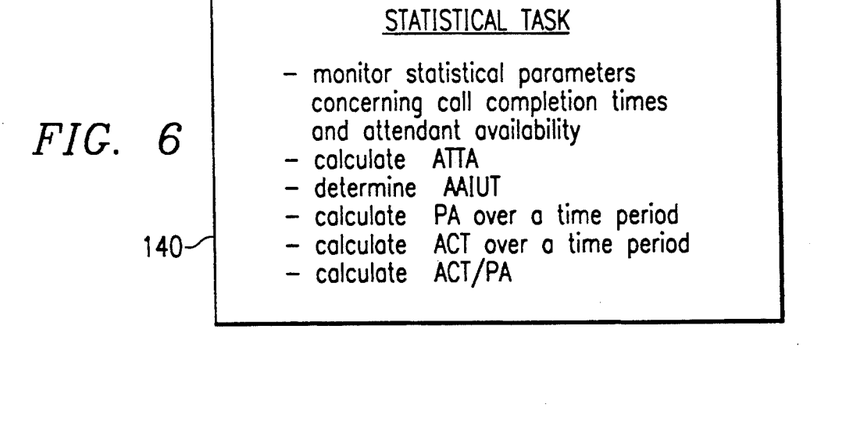
FIG. 6 illustrates various functions performed by statistical task 140 illustrated in FIG. 1.
Figure 7:
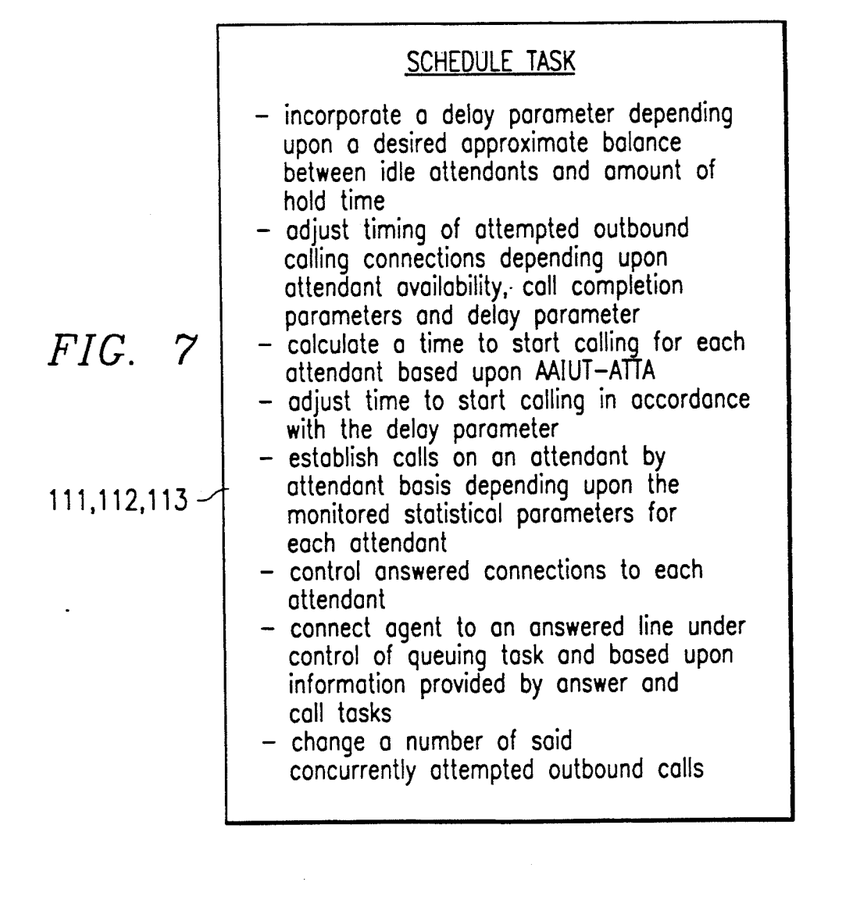
FIG. 7 illustrates various functions performed by schedule tasks 111, 112, 113 illustrated in FIG. 1.
Figure 8:
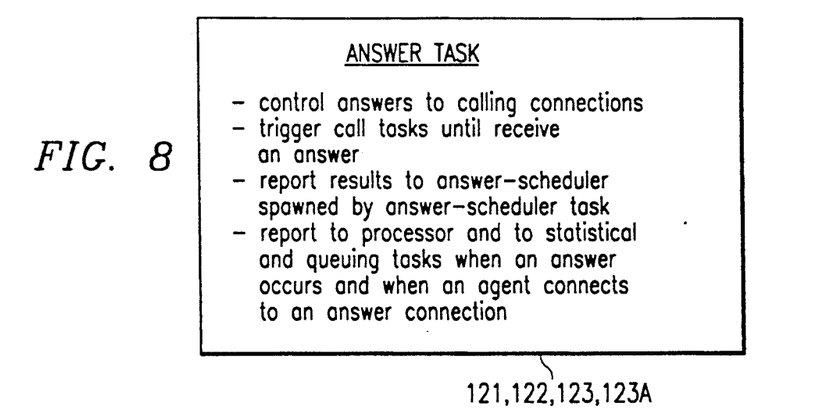
FIG. 8 illustrates various functions performed by answer tasks 121, 122, 123, 123A illustrated in FIG. 1.
Figure 9:
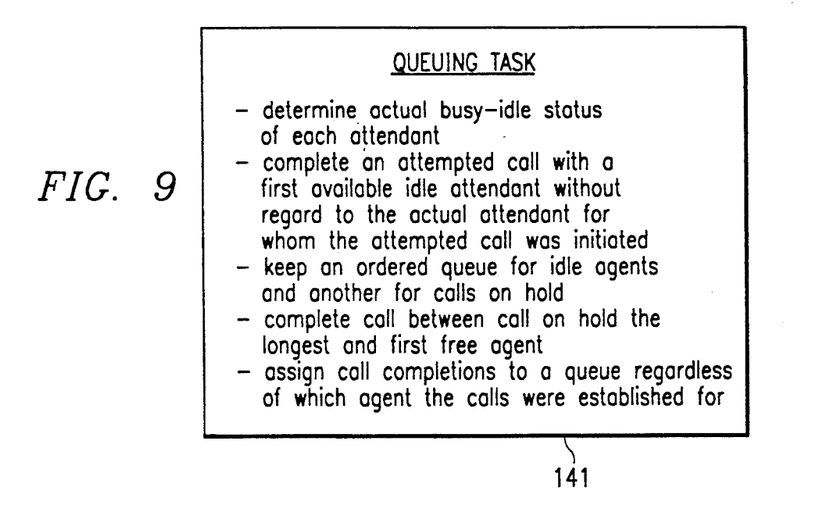
FIG. 9 illustrates various functions performed by queuing task 141 illustrated in FIG. 1.
Figure 10:
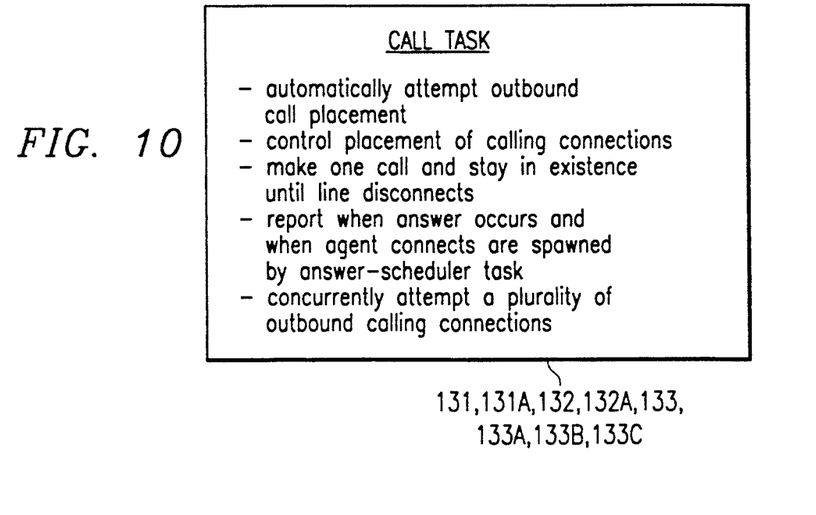
FIG. 10 illustrates various functions performed by call tasks 131, 131A, 132, 132A, 133, 133A, 133B, 133C illustrated in FIG. 1.

Typically, this has been done by computer 51 communicating over bus 511 with computer 57 and providing computer 57 with a number of telephone numbers which are to be called throughout the course of a time period. Call control computer 57 then places calls through telephone switch 56 by first establishing the call via use of a call placement and call progress determination circuit 58. The system works such that circuit 58 dials a call over one of the trunks 501 and monitors the progress of the call via lines 504 to determine whether the call has been answered, a busy signal has been returned or a no-answer situation exists. Upon determination of an answer, that information is communicated (either through switch 56 or via a direct bus connection) to call control computer 57 which in turn monitors which agent is then available. Computer 57 then controls telephone switch 56 to complete a connection from the active trunk 501 over a selected line 502 to a selected agent, such as agent one at station 54. Call control computer 57 then, via bus 510, transmits information to terminal 52 indicating the identity of the called party. At the same time, terminal 52 communicates this information to computer 51 over leads 503. Computer 51 then accesses its data base and provides the block of data to the appropriate agent operating in this respect in the inquiry mode.

System 50 then operates to automatically place calls to called parties and must do so in a manner such that when the calls are answered, an attendant is available. The efficiency with which call control computer 57 performs its function (predictive dialing) determines the efficiency and thus the profitability of system 50.

In addition, the efficiency with which call progress determination can be made is an important factor and is the subject of concurrently filed copending patent application entitled "Call Progress Detection Circuitry and Method," Ser. No. 07/657,530, which application is hereby incorporated by reference herein.

For the purposes of this invention, definitions of pertinent statistical parameters of the predictive dialer are employed within call control computer 57 as follows:

AAIUT: Average Agent In-Use Time. This is the average time that each individual agent is connected to a call and unavailable to take new calls. This time is a combination of the time that an agent is connected to a called party as well as any wrap-up time after the call when the agent is not available for new calls. The pacing task can calculate either an individual average AAIUT for each agent's recent history or an overall average of all agents' AAIUT, using a sliding-window average. Individual averages work well for agent groups under 5-8 agents, while an overall average is adequate for groups larger than that. Usually the average is taken over the last 20-40 calls. The AAIUT average can then be used by the pacing task to predict when each agent will be available next to take more calls. The abbreviation AAIUT will be used to describe this window-averaged agent in-use time. Again this is derived over the last N calls.

PA: Probability of answer. This is defined as the ratio of answered to no-answer calls. An answer rate of 0.4 indicates that there is a 40% probability that any particular call will require an agent. This statistic is derived as a first step to determining ATTA.

ACT: Average Call Time. This is defined as the average time to place a single call on the system. This is essentially the average of a parameter called the Call Interval that is measured for each call placed on a campaign. The call interval (CI) is defined as the time that a phone line is involved in the process of a call, and no agent is attached. All calls have a CI parameter, but it is defined differently on agent-handled (answered) and automatically-handled (no-answer) calls. For automatically handled calls, the call interval is defined as simply the time from line seizure and dialing to disconnect. This could be a no-answer call, busy, or wrong-number intercept call. For answered calls, the call interval is defined as the time from line seizure to called-party answer. CI does not include called-party on-hold time (CPHT). The ACT parameter is an average of call intervals over all types of calls on the system, which includes no-answer, busy and answered calls. The abbreviation ACT is used primarily to describe the window-averaged call intervals in this document.

The pacing task can use a sliding-window average of call intervals to determine the average single call time for the system's recent calling history. The ACT statistic is used with the PA statistic to derive ATTA.

ATTA: Average Time-to-Answer. This is defined as the average time it takes to place a series of calls until an answer occurs on one of the calls. The calls can be placed serially on a single line, or overlapped on multiple lines, but ATTA is defined as the time from the start of the first call to the first answer. This statistic can be calculated by timing the system's answer call attempts from start to first answer and developing a windowed average of the last N answer task times. However, if the call list has a low probability of answer, it may take a long time to directly calculate ATTA. A more efficient way to calculate ATTA is to divide the windowed ACT by PA. Since both ACT and PA can be derived after every call, ATTA can also be derived after every call, instead of waiting for an answer to occur.

The manner of calculating the variables ATTA and AAIUT will now be discussed in more detail with reference to FIGS. 3A-3D.

Figure 3A:
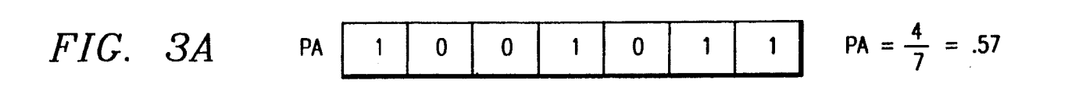
FIGS. 3A–3D show registers used to store statistics and to generate system parameters.
Figure 3B:
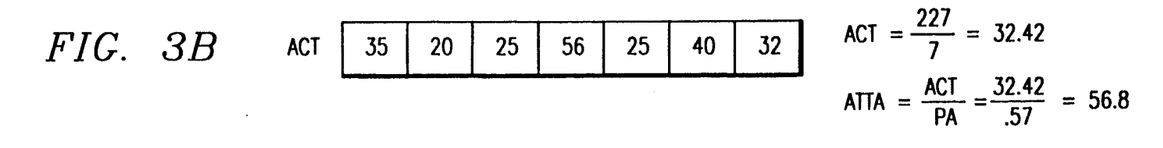
Figure 3C:
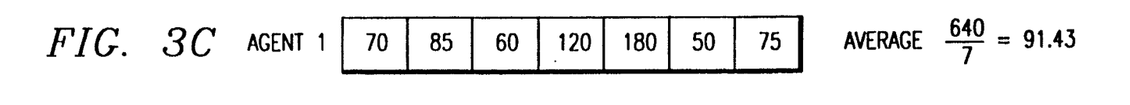
Figure 3D:
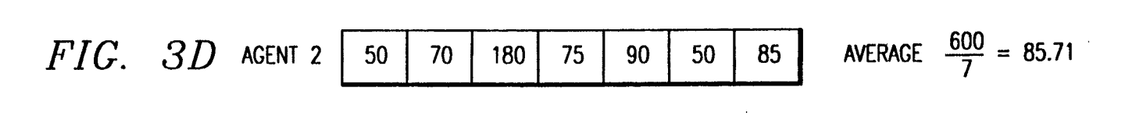

The calculation of ATTA requires previous calculation of the probability of answer (PA) and the average calling time (ACT). These two parameters are shown in FIGS. 3A and 3D, respectively, where registers each having seven cells are shown. Note, however, that for the example only seven cells are used. In reality, the register would have perhaps 30 cells or more depending upon the desired responsiveness of the system. The individual cells of the PA register would provide for every call a 1 or 0 depending upon the completion or non-completion of the call. After the register is full, each new call causes the bit that has been there the longest to be dropped, and the new call result added so that, in reality, the registers are dynamically tracking the most recent calls over time.

In a similar fashion, the average calling time ACT register keeps the number of seconds required for the call interval (CI) on each call. Again, only data about the last seven calls will be maintained in the window.

Making the calculations then from FIG. 3A, the number of 1's for the cells are added together. In this case they would add to 4. They are then divided by 7, resulting in a PA of 0.57. From FIG. 3B, the ACT seconds would add to 227, divided by 7, which would give an ACT of 32.42. From these two numbers the ATTA can be calculated as shown to come out to be 56.8. The manner of calculating the agent's in-use time, as shown in FIG. 3C and 3D for agents 1 and 2, respectively, is simply the matter of recording in seconds the amount of time the agent actually takes for a call. Thus, for agent 1 the average in-use time is 91.43 seconds, and for agent 2, the average in-use time is 85.71 seconds.

It should be noted, of course, that these averages will change as the per call time changes, and the number of cells monitored will determine the responsiveness of the averages over a period of time. Therefore, the number of cells can be either fixed or adjustable as the user desires.

The importance of utilizing proper algorithms and of controlling the system for flexibility will now be discussed with respect to FIG. 2.

Figure 2:
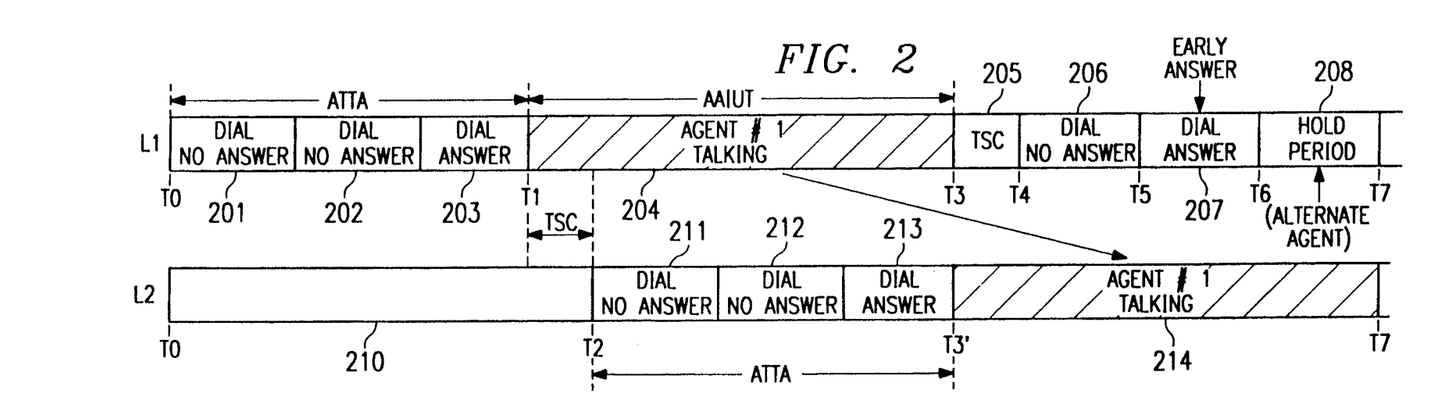
FIG. 2 shows time lines of the activity on two station lines.

Turning now to FIG. 2, let us look at line 1. At time T0, as shown in box 201, there is a dial with a no-answer which means the system dialed the number and there was no answer. The system then determines this fact and dials another number, again with no answer, as shown in box 202. In box 203, the dialed number answers and a live person comes on the line. Using the calculation ATTA = ACT/PA if we have previously determined ACT and PA, we know the average length of time for this sequence of events will be ATTA.

At time T1 agent one is connected to the answered call and begins talking, as shown in box 204. The average time the agent is in active communication is known as the average agent in-use time (AAIUT). If we assume that this agent talks the average time, and thus at time T3, agent one completes the call and goes on-hook.

Certainly, if we wait until time T3 to begin another call sequence, agent one would sit idle for a period that would be on average equal to the AATA period. Thus, for more efficiency, we must predict time T3 from our statistical base and move backward to time T2 which is shown with respect to telephone line L2 and begin the new dialing sequence. This new dialing sequence is performed by a task belonging to each agent called the call scheduler. As shown, if the calls follow the typed call sequence and if the statistics are accurate, this agent's scheduler will place two no-answer calls 211, 212 followed by answered call 213. Thus, at time T3' which in the ideal situation would coincide perfectly with time T3 when agent one is finished talking on line L1, a connection would be available for agent one to begin talking on line L2. This is, of course, ideal and such perfection is rarely achieved.

Returning now to line L1, the period of time from time T1 until time T2 is known as the Time to Start Calling (TSC). This parameter is derived by subtracting the current ATTA from the AAIUT. This time is shown in box 205, and the process is repeated with a dial no-answer box 206. This is followed by an early answer box 207, which causes a problem. The simple solution to this problem is to put the called person on hold (playing a mechanical message) until time T7 when agent one is presumably finished with the conversation on line L2. This, of course, is not a desirable situation and perhaps an alternate attendant would come free prior to time T7 at this point in time. An alternative method would be to disconnect the called party if no agent is available to take the call. The party could be called at a later date when an agent is available.

A statistical improvement can be made when more than one agent is on the system. When an answer occurs from agent #1's scheduler, it can be allowed to go to the first available agent, instead of being constrained to go to the agent whose scheduler generated the answer. If this occurs, the scheduler of agent #1 should ignore the fact that its answer has been taken by some other agent, and wait for its agent to get an answer from another agent's scheduler (possibly the agent who took the call). When the original agent does get an answer, the scheduler does its normal calculations to determine when to spawn the next calling task. Meanwhile, the scheduler task of agent #2 who took the original answer should also calculate its normal schedule time. Since agent #2 is talking on the stolen call, the scheduler should spawn a new answer task at the normally scheduled time for that agent, even though there is already one spawned that has not answered yet.

Certainly, when several attendants are being controlled by a statistical computer, it is not unreasonable to expect that on a statistical basis, an attendant will come free prior to time T7 to handle the connection. Thus, when any agent comes free, even an agent associated with any other call scheduling routine, the free agent is assigned to the call that has been on hold the longest.

By reviewing FIG. 2, it is clear that with respect to agent one, there are two calls that are being managed concurrently, one call on line L1 and one call on line L2. These calls are managed by call tasks 131 and 131A as shown in FIG. 1.

Figure 1:
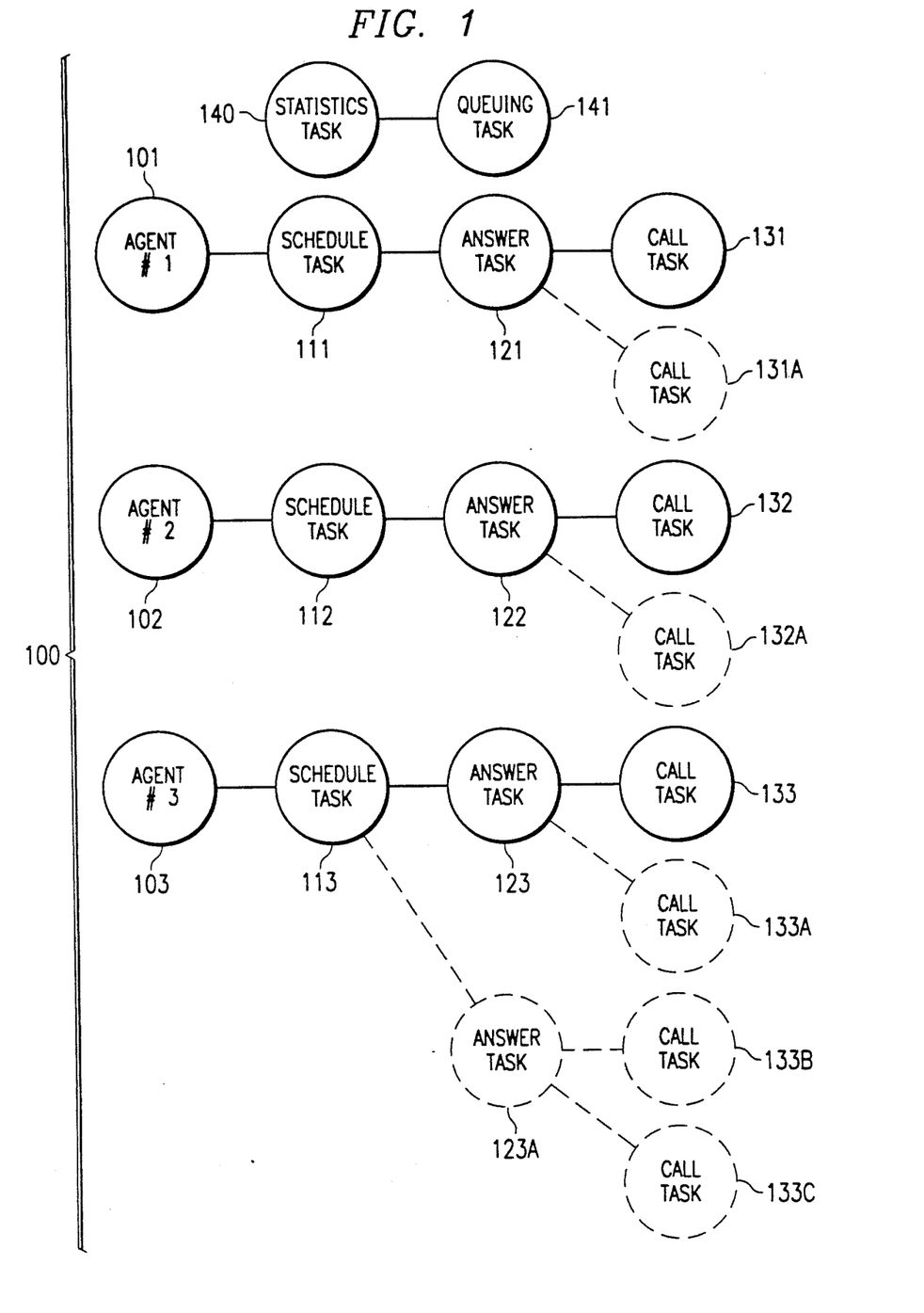
FIG. 1. shows a three agent system and the various tasks assigned to handle each agent.

As shown in FIG. 1, the predictive calling (dialing) algorithm 100 employed within call control computer 57 allows a system to automatically place calls for live agents in such a way as to cause a new call to be answered close to the time when the agent finishes talking on the previous call.

The predictive calling algorithm 100 is described here as being implemented with five types of concurrent tasks. The five types of tasks are:
1) A statistics gathering task 140;
2) A queueing and control task 141;
3) Schedule Task 111, 112, 113;
4) Answer Task 121, 122, 123, 123A; and
5) Call Task 131, 131A, 132, 132A, 133, 133A, 133B, 133C.

There is one statistic-gathering task 140 for each campaign on the system. This task exists to calculate three important averages in the system:
Average Agent In-Use Time (AAIUT)
Average Time-To-Answer (ATTA)
Average Call Time (ACT)

In small sytems, an individual AAIUT parameter is kept for each agent on the system. This is kept by a windowed average of the last N calls handled by each agent. Large systems keep a single AAIUT for all agents. There is only one ATTA and ACT parameter for each campaign. The ACT parameter is calculated by a windowed average of the last N calls handled by the whole campaign. The ATTA parameter is calculated from a windowed average of the last N calls handled by the system. Also, the statistics task counts aborted calls, and other pertinent statistics. These parameters are used in the schedule task to control the predictive calling algorithm.

There is only one queueing task 141 for each campaign in the system. The queueing task exists to control the queue of agents waiting for a call, and the queue of customers waiting for an agent. (These two queues are mutually exclusive at any point in time). The queue task follows the FIFO rule for both queues, so that the agent that has been idle the longest will get the first answered call, and the customer that has been on hold the longest will get the first free agent. The queue task can also set the time that a call will wait in queue before removing the call (MQTAC).

The last three types of tasks are the schedule task 111, the answer task 121, and the call task 131. There is one scheduler task for each agent on the system. Scheduler tasks can spawn answer tasks, and answer tasks can spawn call tasks.

The call task is the simplest and lowest level task of the three-level call-placing task hierarchy. The call task is always spawned by an answer task, and the call task's job is to place one call and stay active until the call is disconnected.

As soon as the call task is spawned, it seizes a line and places a single call. If the call is a live answer, the call task must report two events; the answer and the agent connect. These must be sent to the statistics-gathering task and parent answer task as soon as they occur. The answer status is sent to both the statistics task and the parent answer task immediately when a live answer occurs. Similarly, the connect status is sent to both the statistics task and the parent answer task immediately when an agent is connected to a call. When the call is completed and the line released, the call task must always report a call-end status to the statistics task and parent answer task. This is true for both answered and no-answer calls. There are five categories of call-end status:
Live Answer (agent was connected)
Dropped Call (live answer—agent wasn't available)
No Answer
Abort (before answer)
Line Fault (no line available time-out)

A specific copy of the call task exists only long enough to make one call and report the various events and call-end status to the statistics and parent task. When the call is completed, that copy of the call task is destroyed by the parent answer task. The messages to the statistics task allow the statistics task to calculate PA and ACT, and from this ATTA can be derived.

The second-level task in the call-placing hierarchy is the answer task. The answer task's job is to spawn call tasks serially until one of the call tasks achieves an answer.

The answer task is spawned by its parent—the schedule task. Then when an answer finally occurs, the answer task reports that answer outcome to its parent schedule task, as well as to the statistics task.

A specific copy of the answer task exists only long enough to achieve one answer and return the answer result to its parent schedule task. That copy of the answer task is then destroyed by the parent scheduler. The answer task can persist until the answered call is completed by the agent, and final call-end answer status is returned from the call task.

In the basic predictive calling algorithm, the answer task spawns only one call task at a time serially. The answer task waits until the first call task is finished and has returned the end-call status before destroying that call task. If the end-call status was an answer, the answer task is finished and will be destroyed by its parent. If the call task returns a no-answer, dropped, or fault end-call status, the answer task will spawn another call task. This in effect places calls serially on a single logical phone line until a call is answered. This type of answer task procedure is called a "serial" answer task, and will always result in one and only one, answer.

The scheduler task is the highest-level task in the predictive calling algorithm. There is one scheduler task for each agent on the system. This task's job is to schedule "answers" for its agent by spawning answer tasks. The scheduler task gets the AAIUT parameter for its own agent from the statistics task, and uses this average to predict when that agent will complete the current call. The answer task has been structured to make it easy for the scheduler task to calculate when to spawn an answer task. Since the statistics task knows the average time it will take after starting an answer task for an answer to occur (ATTA statistic), and the average time that the associated agent will talk (AAIUT statistic), the scheduler can determine the optimum time to spawn an answer task so that the next answer for that agent will occur (statistically) just as the agent completes the previous call. This optimum time is calculated with the following equation:

$$TSC = AAIUT - ATTA$$

where TSC is the time to start the answer task calling after the agent was connected to the previous answered call.

One example of how the scheduler task works was discussed with respect to FIG. 2 which shows the simple single-agent case and which assumes that the answer task's ATTA is shorter than the agent's AAIUT. In all cases, when an agent logs on the system, a schedule task is spawned for that agent. The schedule task in turn immediately spawns a single answer task, thus starting calling on a line such as line L1, and scheduling the first answer 204 for the new agent at time T1.

Because the in-use time of this agent (AAIUT) is longer than the time it takes for the answer task to get an answer, the scheduler task will not need to spawn a second answer task until sometime after the agent is connected to the first answered call. Since the scheduler would like the second answer to occur just when the agent completes the first call, the scheduler task should wait until AAIUT −ATTA (TSC) seconds (which is time T1) after the agent goes in-use on the first call, and then spawn the second answer task. The schedule task sets a timer called the answer-timer or TSC timer for AAIUT−ATTA seconds when the agent is connected to the first call. When the timer expires, the schedule task knows to spawn a new answer task. The equation for setting the answer timer is:

Answer Timer = AAIUT − ATTA if AAIUT > /= ATTA, or

Answer Timer = 0 if AAIUT < ATTA (spawn immediately).

This procedure also directly extends to multiple agents by simply spawning a new scheduler for each new agent.

Thus, the system has the capability for concurrently attempting a plurality of outbound calling connections, and has the capability of changing the number of concurrently attempted outbound calls as a function of ATTA and AAIUT. In addition, the TSC value can be adjusted using the delay parameter by the system administrator to achieve a desired approximate balance of the system. Thus, one important attribute of the system is that the system administrator can adjust a single function to achieve the desired tradeoffs between agent productivity and hold time. In this manner, by observing the parameters of the system, such as agent idle time and called party on-hold time, the administrator can set the desired approximate balance, and the system will maintain that approximate balance even though the number of agents changes, the call answer time changes, or the agent in-use time changes. When an answer occurs on a system with multiple agents, and all agents are busy, the answered call is placed on hold. The queueing task queues the call, and the first free agent will be connected to the call. Other answered calls are placed on the queue in the order they occur. The first free agent is always connected to the call that has been on hold the longest, instead of waiting to connect the call to the specific agent whose scheduler started the call. Conversely, if several agents are free when an answer occurs, the agent that has been idle the longest will be connected to the call. Again, the call may have been scheduled for a different agent, but the longest idle agent will get the call.

This concept of call scheduling by individual agent but connection by a pool of agents, i.e., first available or longest idle, is one of the keys to this new predictive calling algorithm's performance.

An improvement on this basic strategy can be made in the case when the agent finishes a call much more quickly than is predicted by the AAIUT parameter. This condition is seen when the agent completes the call, and the schedule task is still running the answer timer, and has not started a new answer task. In this case the timer should be killed, and a new answer task started immediately. This mode is called the "fast restart" mode and should always be used for best performance.

As long as AAIUT > ATTA, the subtraction method AAIUT −ATTA works satisfactorily to tell the answer-scheduler task when to spawn an answer task. However, when AAIUT < ATTA, TSC goes negative. Since this indicates that calling should have started before that agent took the current call, the best that can be done with the algorithm described here is to immediately start calling. During each agent's call session, a scheduler task is assigned to that agent for the duration of that agent's session. Each scheduler task has four conditions that it must recognize to take actions. These conditions are:

1) When an agent first logs on, the schedule task is spawned. As soon as the scheduler is initialized, one answer task is spawned, and the scheduler places the agent on the idle agent queue in the queue task.

2) When one of the scheduler's answer tasks gets an answer, the call is placed on the answer queue in the queue task for the agent that has been idle the longest. The scheduler waits for the answer task to report that the last call task has completed, and then kills the answer task.

3) When the scheduler's agent is connected to a call by the queue task, the scheduler sets the answer timer to the calculated value and waits.

4) When the scheduler's answer timer elapses, the schedule task spawns one answer task.

5) When the agent completes a call, the scheduler places the agent on the idle agent queue. The scheduler then checks to see if its answer timer is running. If the timer is running, it is killed, and a new answer task is spawned. This is called the "fast restart" function, and is another key technique in the predictive calling algorithm. A more obvious procedure would be to wait until the timer expires and then start the answer task, but this method lowers call efficiency greatly in cases where agent talk-time has a large variance. If the timer is not running, and an answer task is in progress, do nothing. If neither the answer timer or an answer task are in progress, do nothing.

To summarize the various components of the system:

| | |
|---|---|
| Statistics Task | |
| Job: | Collect and calculate statistics for predictive calling algorithm. Keep AAIUT for each agent or system. Keep ATTA and ACT for system. |
| Knows: | When answer tasks starts. When answer occurs. When agent is connected. When call is completed. |
| Queue Task | |
| Job: | Keep an ordered queue for idle agents and another for calls on hold. Make match between agent that has been idle the longest and first answered call. Make match between call on hold the longest and first free agent. |
| Knows: | When answer occurs. When agent enters or leaves system. When agent goes idle. |
| Call Task | |
| Job: | Make one call and stay in existence until line disconnects. Report when an answer occurs and when agent connects are spawned by the answer-scheduler tasks. |
| Knows: | How to place a call. When call is answered. When agent is connected. When call ends. How to determine call outcome (ans/no ans). Dies after completing one call. |
| Answer Task | |
| Job: | Trigger call tasks until it gets an answer. Report result to answer-scheduler spawned by answer-scheduler task. |
| Knows: | How to trigger a call task. How to interpret call task status reports. When to trigger subsequent call tasks. Dies after line is disconnected. |
| Scheduler Task | |
| Job: | To schedule answers for agents to occur when agents become free. Scheduler task is spawned when agent logs on system. |
| Knows: | Gets ATTA, AAIUT for that agent. How to calculate time delay before starting answer task. How to set delay timer (answer timer). How to trigger answer task. When agent is connected to call. |
| | When agent has completed call. Dies when agent logs off. |

Some of the various functions performed by statistical task 140, schedule tasks 111, 112, 113, answer tasks 121, 122, 123, 123A, queuing tasks 141 and call tasks 131, 131A, 132, 132A, 133, 133A, 133B, 133C, are illustrated in FIGS. 6–10.

Although this description describes the invention with reference to the above specified embodiments, the claims and not this description limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A call pacing system for controlling outbound calling connections for handling by one or more attendants, said system comprising:
   a computer for monitoring statistical parameters concerning call completion times and each one of said attendant's availability,
   said computer incorporating with said statistical parameters a delay parameter depending upon a desired approximate balance between idle attendants and an amount of non-communication holding time a completed call connection is to be subject to,
   said computer adjusting timing of attempted outbound calling connections depending upon each one of said attendant's availability and said call completion parameters and said delay parameter; and
   a telephone switch coupled to said computer and to a call placement circuit, said telephone switch adapted for connection to telephone trunks, said computer, telephone switch and call placement circuit automatically attempting outbound call placement over said trunks.

2. The system set forth in claim 1 wherein said attempted outbound calling connections are made based on the probable availability of particular attendants and wherein said computer further determines actual busy-idle status of each one of said attendants, said system further including:
   an agent telephone coupled to said telephone switch, wherein said computer and said telephone switch complete an attempted call with said agent telephone associated with a first available idle attendant without regard to the actual attendant for whom said attempted call was initiated.

3. The system set forth in claim 1 wherein said computer calculates an average time to an answer and makes a determination of an average attendant in-use time.

4. The system set forth in claim 3 wherein said determination of average attendant in-use time is made separately for each attendant.

5. The system set forth in claim 4 and wherein said computer calculates a time to start calling for each individual attendant based upon a calculated difference between said average attendant in-use time and said average time to an answer and said computer adjusts said time to start calling in accordance with said delay parameter.

6. The system set forth in claim 5 wherein said computer calculates a probability of answer over a time period and calculates an average calling time over said time period.

7. The system set forth in claim 6 wherein said computer divides said average calling time by said probability of answer.

8. The system set forth in claim 7 wherein said computer performs said calculations on a call-by-call basis.

9. The system set forth in claim 1 wherein said computer monitors said statistical parameters individually for each one of said attendants, and wherein said computer, said telephone switch and said call placement circuit establish calls on an attendant by attendant basis depending upon said monitored statistical parameters for each one of said attendants.

10. The system set forth in claim 9 further comprising:
an attendants call completions queue,
and wherein said computer assigns said call completions to said queue regardless of which attendant said calls were established for.

11. The system set forth in claim 10 wherein idle attendants are connected to a next available established call from said attendants call completions queue.

12. The system set forth in claim 1, wherein said computer, said telephone switch and said call placement circuit concurrently attempt a plurality of said outbound calling connections, and wherein said computer changes a number of said concurrently attempted outbound calls.

13. The system set forth in claim 1 wherein said computer controls:
placement of calling connections,
answers to said calling connections, and
answered connections to each one of said attendants in a hierarchical arrangement.

14. A method for controlling outbound calling connections for handling by one or more attendants, said method comprising:
monitoring statistical parameters concerning call completion times and each one of said attendants' availability;
incorporating with said statistical parameters a received delay parameter depending upon a desired approximate balance between idle attendants and an amount of non-communication holding time a completed call connection is to be subject to;
automatically attempting outbound call placement; and
adjusting under control of said monitoring step timing of attempted outbound calling connections depending upon each one of said attendants' availability and said call completion parameters and said delay parameter.

15. The method set forth in claim 14 wherein said attempted outbound calling connections are made based on the probable availability of particular attendants and further including the steps of:
determining actual busy-idle status of each one of said attendants; and
completing an attempted call with a first available idle attendant without regard to the actual attendant for which said attempted call was initiated.

16. The method set forth in claim 14 wherein said statistical parameters monitoring step includes:
calculation of an average time to an answer; and
determination of an average attendant in-use time.

17. The method set forth in claim 16 wherein said determination of average attendant in-use time is made separately for each attendant.

18. The method set forth in claim 17 and wherein said incorporating step includes the steps of:
calculating a time to begin a call based upon a calculated difference between said average attendant in-use time and said average time to an answer; and
adjusting said time to begin a call in accordance with said delay parameter.

19. The method set forth in claim 18 wherein said average time to an answer calculation step includes the steps of:
calculating a probability of answer over a time period; and
calculating an average calling time over said time period.

20. The method as set forth in claim 19 wherein said average time to an answer calculation step further includes the step of:
dividing said calculated average calling time by said calculated probability of answer.

21. The method set forth in claim 20 further comprising the step of:
performing said calculations on a call-by-call basis.

22. The method set forth in claim 14 further comprising the steps of:
monitoring said statistical parameters individually for each one of said attendants; and
establishing calls on an attendant by attendant basis depending upon said monitored statistical parameters for each one of said attendants.

23. The method set forth in claim 22 further comprising an attendant call completions queue and the step of:
assigning said call completions to said queue regardless of which attendant said calls were established for.

24. The method set forth in claim 23 wherein an idle attendant is connected to a next available established call from said call completions queue.

25. A processor controlled system for controlling call placement in an agent system where said agent system has multiple agents handling calls to multiple called parties all under processor control and where there can be several call completion attempts before a called party answers a called connection, the processor controlled system comprising:
a computer for running a statistical task, said statistical task:
determining an average agent in-use time which includes any time an agent is not available to communicate with a called party;
determining an average time it takes for an answer to occur on a series of outbound placed calling connections;
running a queuing task for maintaining an ordered queue of idle agents and an ordered queue of answered calls not actively communicating (on hold) with an agent;
running one or more call tasks assigned to each agent for initiating individual calls under control of numbers to be called as furnished by said processor; and
running one or more answer tasks operable for starting and stopping said call tasks for a particular agent; and
a call placement circuit for reporting to said processor and to said statistical and queuing tasks when an answer occurs and when an agent connects to said answer connection, said computer running a schedule task associated with each agent and causing a connection of said associated agent to an answered line under control of said queuing task and based upon information provided by said answer and call tasks.

26. The processor controlled system set forth in claim 25 wherein each said agent may have a plurality of said answer tasks associated therewith, each answer task having capability of having a plurality of call tasks associated therewith.

27. The processor controlled system set forth in claim 25 wherein said computer incorporates a delay parameter into said schedule tasks which controls a balance between agent idle time and answer on-hold time.

28. The processor controlled system set forth in claim 27 further comprising means for modifying said delay parameter from time to time.

29. The processor controlled system set forth in claim 25 wherein said average agent in-use time and said average time it takes for an answer are each established dynamically for any series of outbound calls.

30. A method for controlling call placement in an agent system where said agent system has multiple agents handling calls to multiple called parties all under processor control and where there can be several call completion attempts before a called party answers a called connection, said method comprising the steps of:

determining an average agent in-use time which includes any time an agent is not available to communicate with a called party;

determining an average time it takes for an answer to occur on a series of outbound placed calling connections;

maintaining an ordered queue of idle agents and an ordered queue of answered calls not actively communicating with an agent;

assigning one or more call tasks to each agent, said tasks operable for initiating individual calls under control of numbers to be called as furnished by said processor; and establishing one or more answer tasks for each agent, said one or more answer tasks operable for starting and stopping said call tasks for a particular agent, said one or more answer tasks including the steps of:

reporting to said processor and to both said determining steps and to both ordered queues when an answer occurs and when an agent connects to said answer connection; and establishing a schedule task associated with each agent, said schedule task operable for causing a connection of said associated agent to an answered line under control of said queues and based upon information provided by said answer and call tasks.

31. The method set forth in claim 30 wherein each said agent may have a plurality of said answer tasks associated therewith, each answer task having capability of having a plurality of call tasks associated therewith.

32. The method set forth in claim 30 wherein said schedule task step includes the step of incorporating a delay parameter into said schedule task which controls a balance between agent idle time and answer on-hold time.

33. The method set forth in claim 32 further including the step of modifying said delay parameter from time to time.

34. The method set forth in claim 30 wherein said average determined times are each established dynamically for any series of outbound calls.

35. A system for controlling call placement in an agent system where said agent system has multiple agents handling calls to multiple called parties all under processor control and where there can be several call completion attempts before a called party answers a called connection, said call placement controlling system comprising:

a computer having a data base of telephone line numbers and data information pertaining to each of said line numbers;

a processor for controlling an establishment of said calls in response to telephone line numbers supplied by said computer; and a plurality of agent terminals connected both to said computer and to said processor;

said processor comprising:

a statistical task running in said processor, said statistical task:

determining an average agent in-use time which includes any time an agent is not available to communicate with a called party; and determining an average time it takes for an answer to occur on a series of outbound placed calling connections;

a queuing task for maintaining an ordered queue of idle agents and an ordered queue of answered calls not actively communicating with an agent;

one or more call tasks assigned to each agent for initiating individual calls under control of numbers to be called as furnished by said processor;

one or more answer tasks operable for starting and stopping said call tasks for a particular agent, said one or more answer tasks reporting to said processor and to said statistical and queuing tasks when an answer to a call task occurs and when an agent connects to a call associated with said answer; and a schedule tasks associated with each agent, said schedule task causing a connection of said associated agent to an answered line under control of said queuing task and based upon information provided by said answer and call tasks.

36. The system set forth in claim 35 further comprising:

transmission means coupled to said plurality of agent terminals for accepting a called telephone number from said processor and for communicating said called telephone number to said computer as an access to said data information in said computer.

37. The system set forth in claim 36 wherein said determination of said average agent in-use time is calculated separately for each agent.

38. The system set forth in claim 37 and wherein said processor calculates a time to start calling based upon a calculated difference between said average agent in-use time and said average time it takes for an answer and wherein said processor adjusts said time to start calling in accordance with a delay parameter.

39. The system set forth in claim 38 wherein said processor calculates a probability of answer over a time period and calculates an average calling time over said time period.

40. The system set forth in claim 39 wherein said processor divides said average calling time by said probability of answer.

41. The system set forth in claim 40 wherein said processor performs said calculations on a call-by-call basis.

42. The system set forth in claim 36,
wherein said processor monitors said average agent in-use time and said average time it takes for an answer individually for each said agent,
and said processor establishes calls on an agent-by-agent basis depending upon said monitored times for said agent.

43. The system set forth in claim 42 further comprising:
an agent call completions queue,
wherein said processor assigns said call completions to said queue regardless of which agent said calls when established for.

44. The system set forth in claim 43 wherein idle agents are connected to a next available established call from said call completions queue.

* * * * *